US008972616B2

(12) United States Patent
Chawla et al.

(10) Patent No.: US 8,972,616 B2
(45) Date of Patent: Mar. 3, 2015

(54) SYSTEM AND METHOD FOR PRIORITIZING ISCSI DATA TRANSMISSION USING DATA CENTER BRIDGING ENABLED SWITCHES

(71) Applicant: Dell Products L.P., Round Rock, TX (US)

(72) Inventors: Gaurav Chawla, Austin, TX (US); Rajesh Narayanan, San Jose, CA (US); Shyamkumar T. Iyer, Nashua, NH (US)

(73) Assignee: Dell Products, L.P., Round Rock, TX (US)

( * ) Notice: Subject to any disclaimer, the term of this patent is extended or adjusted under 35 U.S.C. 154(b) by 48 days.

(21) Appl. No.: 13/833,312

(22) Filed: Mar. 15, 2013

(65) Prior Publication Data

US 2014/0281045 A1 Sep. 18, 2014

(51) Int. Cl.
*G06F 3/00* (2006.01)
*G06F 13/00* (2006.01)

(52) U.S. Cl.
CPC ........................................ *G06F 3/00* (2013.01)
USPC ................................................ 710/6; 710/33

(58) Field of Classification Search
None
See application file for complete search history.

(56) References Cited

U.S. PATENT DOCUMENTS

| 7,796,638 | B2* | 9/2010 | Wang et al. | 370/465 |
| 2010/0287262 | A1* | 11/2010 | Elzur | 709/220 |
| 2013/0058254 | A1* | 3/2013 | Chawla et al. | 370/254 |
| 2014/0059265 | A1* | 2/2014 | Iyer et al. | 710/313 |

* cited by examiner

*Primary Examiner* — Idriss N Alrobaye
*Assistant Examiner* — Ronald Modo
(74) *Attorney, Agent, or Firm* — Isidore PLLC (57) ABSTRACT

A method of prioritizing data transmissions between a SCSI initiator and a SCSI target in a network system with DCB enabled switches. The method includes a switch controller detecting a SCSI set priority response transmitted via a first pair of switch ports from a SCSI target to a SCSI initiator, which communicate SCSI messaging and transmit I/O data via the first pair of switch ports. In response to detecting the SCSI set priority response, the priority data established by the SCSI target is retrieved and, based on the retrieved priority data, the switch controller autonomously sets the DCB priority for the first pair of switch ports to a first DCB priority value correlated to the retrieved priority data. Transmission of the I/O data between the SCSI initiator and the SCSI target is supported with a priority of the first pair of switch ports set to the first DCB priority value.

21 Claims, 7 Drawing Sheets

SYSTEM AND METHOD FOR PRIORITIZING ISCSI DATA TRANSMISSION USING DATA CENTER BRIDGING ENABLED SWITCHES

BACKGROUND

1. Technical Field

The present disclosure generally relates to internet small computer system interface (iSCSI) data networks and in particular to prioritizing data transmission between iSCSI devices using data center bridging enabled switches.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with multiple switches and storage area networks (SAN).

A network switch or switch is a telecommunication device which receives a message from originating devices, including information handling systems, connected to a data communication network, such as a local area network or storage area network, and then transmits the message to the target device for which the message was intended. Local Area Networks (LANs) and Wide Area Networks (WANs) typically contain a number of linked multi-layer switches. Network switches frequently use Ethernet protocols. Data center bridging (DCB) specifies a set of enhancements to Ethernet local area network protocols that includes enabling manual setting of a DCB priority for each network switch by an administrator. The required manual setting of the DCB priorities prevents the network switches from being able to respond to changes to priorities in I/O workloads.

BRIEF SUMMARY

Disclosed is a method, a computer network system and a network accessible storage system that enables (1) prioritizing data transmissions between a SCSI initiator and a SCSI target in a network system having one or more DCB enabled switches and that enables (2) prioritizing data storage operations on data storage devices used to store data at the SCSI target.

According to a one embodiment, the method comprises a switch controller detecting a small computer system interface (SCSI) set priority response being transmitted via a first switch port between SCSI devices. The SCSI devices include a SCSI target and a SCSI initiator that communicate SCSI commands and responses and transmit input/output (I/O) data via the first switch port. In response to detecting the SCSI set priority response, the priority data established by the SCSI target is retrieved and based on the retrieved priority data, a data center bridging (DCB) priority is autonomously set, for the first switch port, to a first DCB priority value correlated to the retrieved priority data. Transmission of the I/O data between the SCSI initiator and the SCSI target is supported with a priority of the first switch port set to the first DCB priority value.

Also disclosed is a computer network system comprising at least one switch configured to route and transmit data between a host computer and a target device. The at least one switch has a plurality of switch ports. A switch controller is coupled to the switch for controlling operation of the switch. The switch controller comprises logic that: passes a plurality of small computer system interface (SCSI) commands and responses between a SCSI initiator and a SCSI target; detects a SCSI set priority response being transmitted from the SCSI target to the SCSI initiator from among the received SCSI commands; and in response to detecting the SCSI set priority response, sets a first data center bridging priority value for a first switch port that is being utilized to transmit input/output (I/O) data between the SCSI initiator and the SCSI target. In one embodiment, the first data center bridging priority value is based on priority data retrieved from the detected SCSI set priority response. In another embodiment, the first data center bridging priority value is based on priority data snooped from the SCSI target.

According to another embodiment, the method comprises a storage system controller detecting receipt of a small computer system interface (SCSI) set priority command from a SCSI initiator with which the storage system is communicating SCSI commands and responses via a first assigned storage port. In response to the detected SCSI set priority command being a request to assign a specific priority that is a higher priority relative to a default initial priority assigned to I/O data transmitted via the assigned first storage port, assigning an available higher priority storage port for communicating the I/O data; generating and transmitting a SCSI set priority response to the SCSI initiator to indicate that the higher priority has been assigned for subsequent communication of the I/O data between the SCSI initiator and the storage system.

Also disclosed is a network-accessible storage system that comprises at least one storage system having a plurality of storage devices and a plurality of storage system ports. A storage controller is coupled to the storage system for controlling operation of the storage system. The storage controller comprises logic that: receives a plurality of small computer system interface (SCSI) commands transmitted from a SCSI initiator to a SCSI target via a first storage system port having a first bandwidth, the storage system ports being utilized to transmit input/output (I/O) data between the SCSI initiator and the SCSI target; detects a SCSI set priority command from among the received SCSI commands; and in response to the detected SCSI set priority command being a high priority SCSI set priority command, moves the transmitted I/O data from the first storage system port to a second storage system port having a second bandwidth and wherein the second bandwidth is greater than the first bandwidth.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a computer network system and a network accessible storage system that enables (1) prioritizing data transmissions between a SCSI initiator and a SCSI target in a network system having one or more data center bridging (DCB) enabled switches and that enables (2) prioritizing data storage on data storage devices used to store data at the SCSI target.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
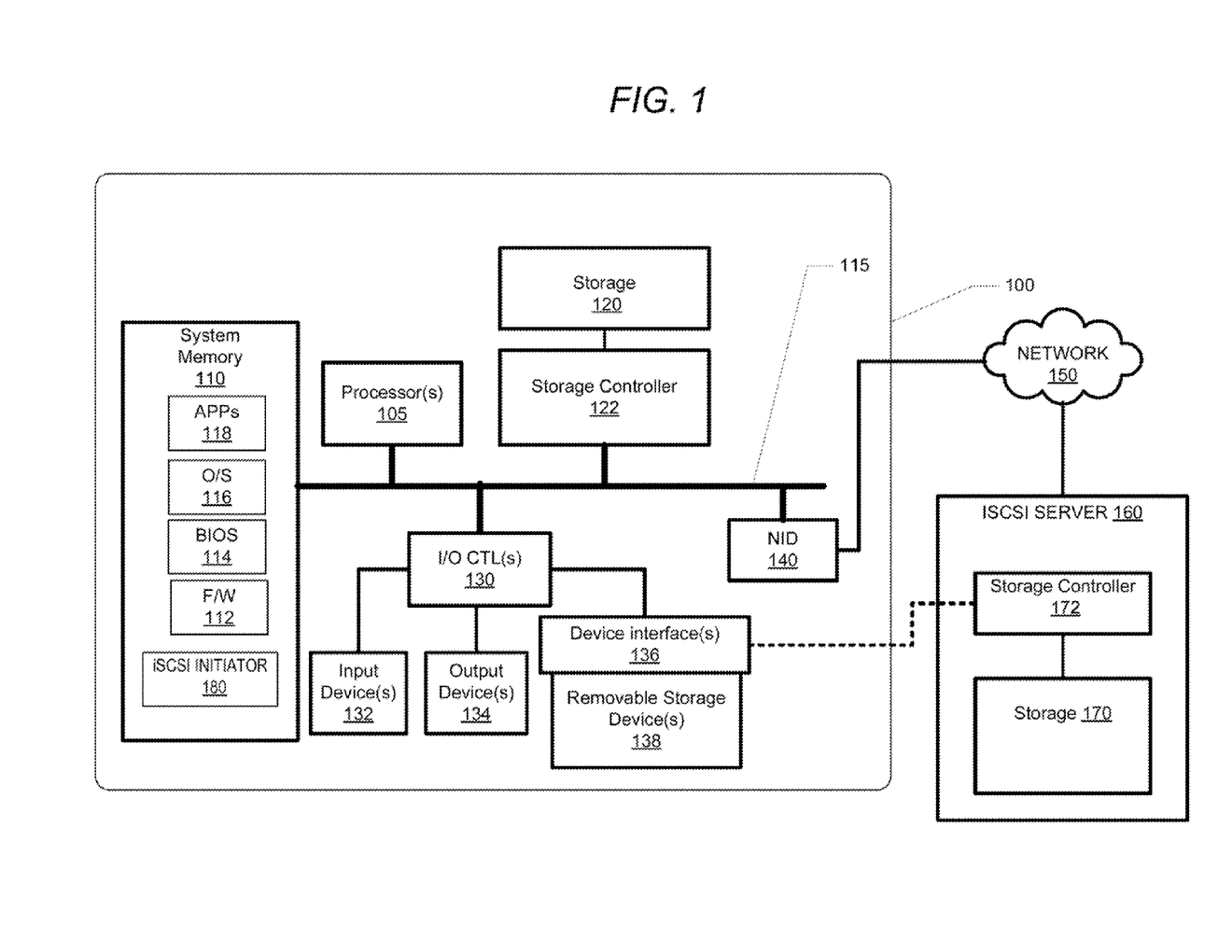
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a local storage controller 122 coupled to local storage 120 within which can be stored software and one or more sets of data (not specifically shown). As shown, system memory 110 can include therein a plurality of modules, including firmware (F/W) 112, basic input/output system (BIOS) 114, operating system (O/S) 116 and application(s) 118. System memory 110 further includes an iSCSI initiator 180 that is used to transmit SCSI commands. The various software and/or firmware modules have varying functionality when their corresponding program code is executed by processor(s) 105 or other processing devices within IHS 100.

IHS 100 further includes one or more input/output (I/O) controllers 130 which support connection to and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) port, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interfaces 136 can further include general purpose I/O interfaces such as I²C, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to iSCSI server 160, which can include a plurality of hard disk drives, solid state storage drives, solid state storage devices or other storage media. The iSCSI server 160 represents a data storage facility which includes a storage controller 172 coupled to storage 170 within which can be stored software and one or more sets of data (not specifically shown). In an alternate embodiment, and as represented by the second set of dashed interconnecting lines, iSCSI server 160 can be directly connected to IHS 100 as an external storage device.

As presented herein, DCB specifies a set of enhancements to Ethernet local area networks. DCB provides improvements in data transmission to eliminate loss due to queue overflow and allows specific bandwidth to be allocated on various links within the network. Because Ethernet was designed to be a best effort network, users can experience loss of data packets when the network or devices connected to the network are full or busy. Also, the embodiments are described from within the environment of a computer-implemented application communicating I/O data with a storage device within a storage area network. The network storage device is configured as an iSCSI target, communicating using the internet small computer system interface (iSCSI) standard. As provided herein, iSCSI is the Internet Protocol (IP) based storage networking standard utilized to link data storage facilities, to facilitate data transfer/transmission over intranets, and to manage storage over long distances. The iSCSI protocol allows the clients, such as host computers called initiators, to send SCSI commands to SCSI storage devices, represented by iSCSI targets on remote servers.

Figure 2:
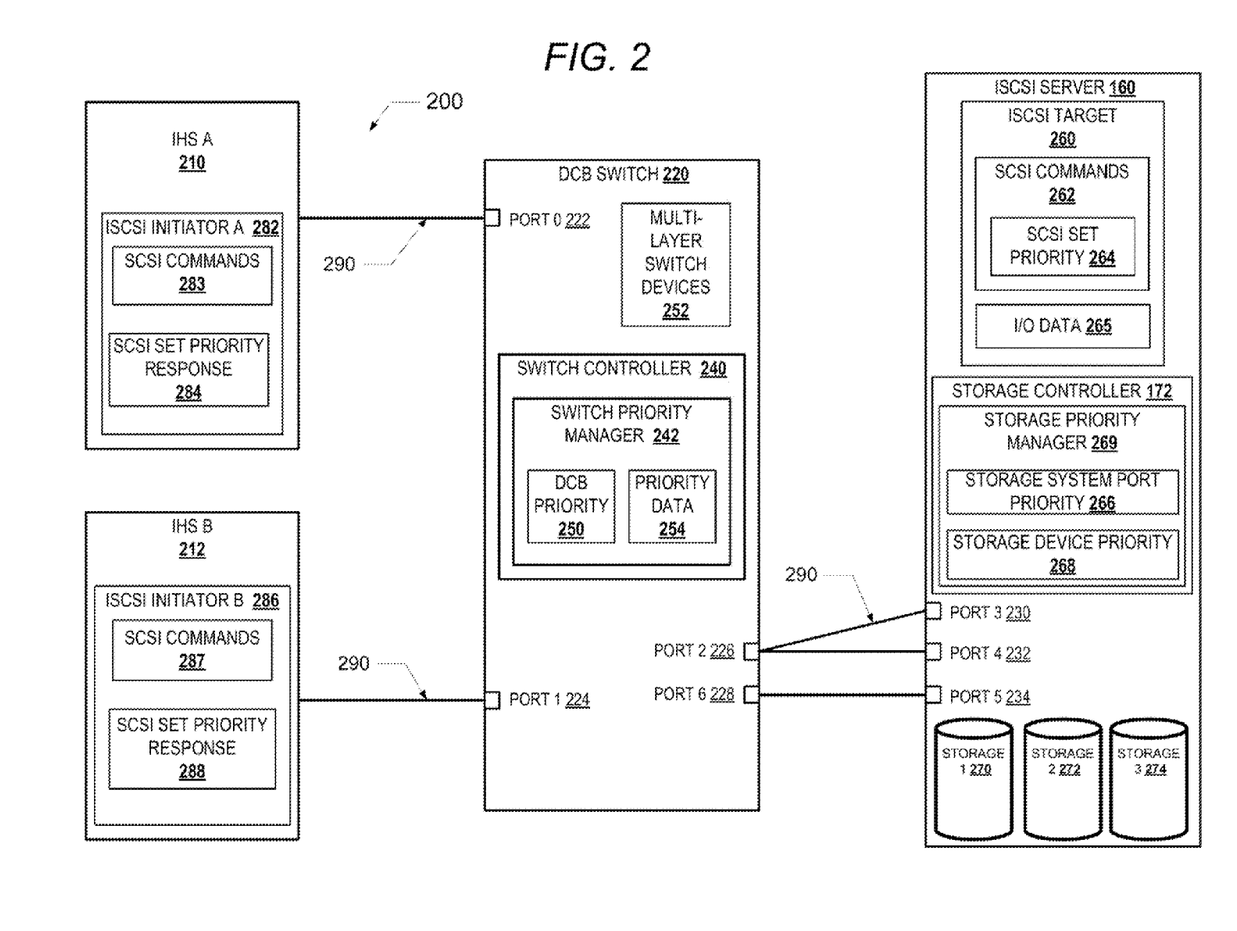
FIG. 2 illustrates a block diagram of an example communication network using a DCB enabled switch in accordance with one or more embodiments.

With reference now to FIG. 2, there is illustrated one embodiment of a communication network 200 that utilizes a DCB enabled switch 220. In the discussion of FIG. 2, reference is also made to elements described in FIG. 1. Communication network 200 generally includes IHS A 210, IHS B 212, DCB switch 220 and iSCSI server 160. IHS A 210 comprises an iSCSI initiator A 282 that (i) issues SCSI commands 283 for transmission to iSCSI server 160 and (ii) receives SCSI responses such as a SCSI set priority response 284 from iSCSI server 160. IHS B 212 comprises an iSCSI initiator B 286 that issues SCSI commands 287 for transmission to iSCSI server 160 and receives SCSI responses such as a SCSI set priority response 288 from iSCSI server 160. IHS A 210 and IHS B 212 can have similar or the same design and/or architecture as IHS 100 of FIG. 1.

Each iSCSI initiator 282, 286 is a functional component (which can be software implemented) that initiates (i.e., begins) a SCSI session by sending a SCSI command to an identified iSCSI target. An iSCSI target 260 is the endpoint that receives commands from the iSCSI initiators 282, 286 and can communicate requested input/output data transfers. The iSCSI target 260 provides to the initiator one or more logical unit numbers (LUNs). SCSI commands 283 and 287 represent the instructions that are sent from the iSCSI initiators 282, 286 to the iSCSI server 160 as part of the process to send, receive and store data on storage devices at the iSCSI server 160.

IHS A 210 and IHS B 212 are in communication with a data center bridging (DCB) enabled switch 220 via a communication fabric 290. The communication fabric 290 enables specific messaging signals to be communicated over specific signal lines (not illustrated). DCB switch 220 includes port 0 222 which is communicatively coupled to IHS A 210. DCB switch 220 also includes port 1 224 which is communicatively coupled to IHS B 212. DCB switch 220 processes and routes messaging signals and information and data between IHS A 210, IHS B 212 and iSCSI server 160.

DCB switch 220 comprises a switch controller 240 and multi-layer switch devices 252. Switch controller 240 contains the logic necessary to process and route data between both IHS A 210, IHS B 212 and iSCSI server 160. Each of the DCB switches within the communication channel can communicate with each other via the communication fabric. Switch controller 240 comprises functional modules or processes including switch priority manager 242. Switch priority manager 242 maintains priority data including DCB priority 250 and storage port priority data 254 for each communication channel established that utilizes the particular DCB switch to route data. As one aspect of the disclosure, switch priority manager 242 can determine and assign DCB priorities 250 to port 0 222, port 1 224, port 2 226 and port 6 228 based on received or snooped storage port priority data 254. Any of ports 222-228 can be designated as an input port or an output port to form an input/output port pair depending upon the direction of the data being transmitted via a channel through DCB switch 220. In a first embodiment, priority data 254 is retrieved from detected SCSI set priority response(s)

284 traversing the DCB switch 220. During establishment of a communication channel between iSCSI initiator and iSCSI target for routing of I/O data 265 through DCB switch 220, switch priority manager 250 snoops on SCSI set priority response 284 and retrieves communicated priority data 254. In another embodiment, the detection of SCSI set priority response 284 triggers DCB switch 220 to snoop the storage device port from which the SCSI set priority response 284 originated and detect or retrieve the priority data 254 from the storage device port. DCB priorities 250 determine the relative priorities to assign to each of a pair of ports (i.e. input/output port pairs 222, 226 and 224, 228) supporting a communication channel between the specific iSCSI initiator and iSCSI target, including identifying which ports are assigned higher priority for DCB switch 220 to utilize when routing or transmitting data through.

According to one aspect of the disclosure, DCB priority manager 250 performs a calculation to convert the priority data 254, communicated as a SCSI protocol value ranging between zero (0) and one (1) into a DCB protocol priority value ranging between zero (0) and seven (7). The DCB priority value and/or DCB priorities 250 can correspond to bandwidth, transmission speed or throughput and security levels allocated to data transmission that utilizes the specific DCB port. Notably, once a DCB priority is determined, that priority is assigned to each of the pair of ports that support the communication into the DCB switch and out of the DCB switch. Thus for example, port 0 222 and port 2 226 would have DCB priorities corresponding to the assigned priority for transmitting I/O data between IHS A 210 and a storage device within iSCSI server 160. This priority would then be set independent of the priority, if any, that can be assigned to communication involving port 1 224 and port 6 228 connecting IHS B 212 and a storage device within iSCSI server 160.

DCB enabled switch 220 is in communication with iSCSI server 160 via communication fabric 290. iSCSI server 160 includes port 3 230, port 4 232 and port 5 234 that are communicatively coupled to DCB enabled switch 220. iSCSI server 160 provides a storage network that contains one or more storage devices. iSCSI server 160 comprises iSCSI target 260, storage controller 172 and storage devices 270, 272 and 274. Each of the iSCSI server components can communicate with each other. In one implementation, iSCSI target 260 is an executable software module running on storage controller 172 or a processor of iSCSI server 160. iSCSI target 260 receives commands from iSCSI initiators 282 and 286. iSCSI target 260 receives and processes SCSI commands 262, including received SCSI report priority commands and SCSI set priority command(s) 264.

Storage controller 172 contains the logic necessary to read and write to storage devices 270-274. Storage controller 172 comprises storage priority manager 269, which manages the assignment of priority and maintains sets or tables of assigned storage priority data, including storage system port priority 266 and storage device priority 268. Storage priority manager 269 assigns priorities to ports 3 230, port 4 232 and port 5 234 and can allocate and/or move the transmission/receiving of I/O data to/between specific ones of ports 230-234 depending upon the assigned priority. Storage system port priority 266 comprises priority values for the transmission of I/O data 265 via specific ones of ports 230-234. Storage device priority 268 comprises priority values for each specific storage device among storage devices 270-274. Storage device priority 268 is related to I/O performance characteristics of the specific storage devices 270-274. In one embodiment, storage device priority 268 can be based on the relative speed at which the particular storage device can store and retrieve data. For example, storage device 1 270 can be a hard disk drive and storage device 2 272 can be a solid state drive such as flash memory. The data transmission speed of a solid state drive is faster than that of a hard disk drive and as such the solid state drive would be assigned a higher priority by storage priority manager 269.

Functions, modules, routines, methods and processes of the present disclosure can be provided as firmware code and/or logic within switch controller 240 and storage controller 172. The firmware code and logic can implement switch priority manager 242 and storage priority manager 269.

Those of ordinary skill in the art will appreciate that the hardware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
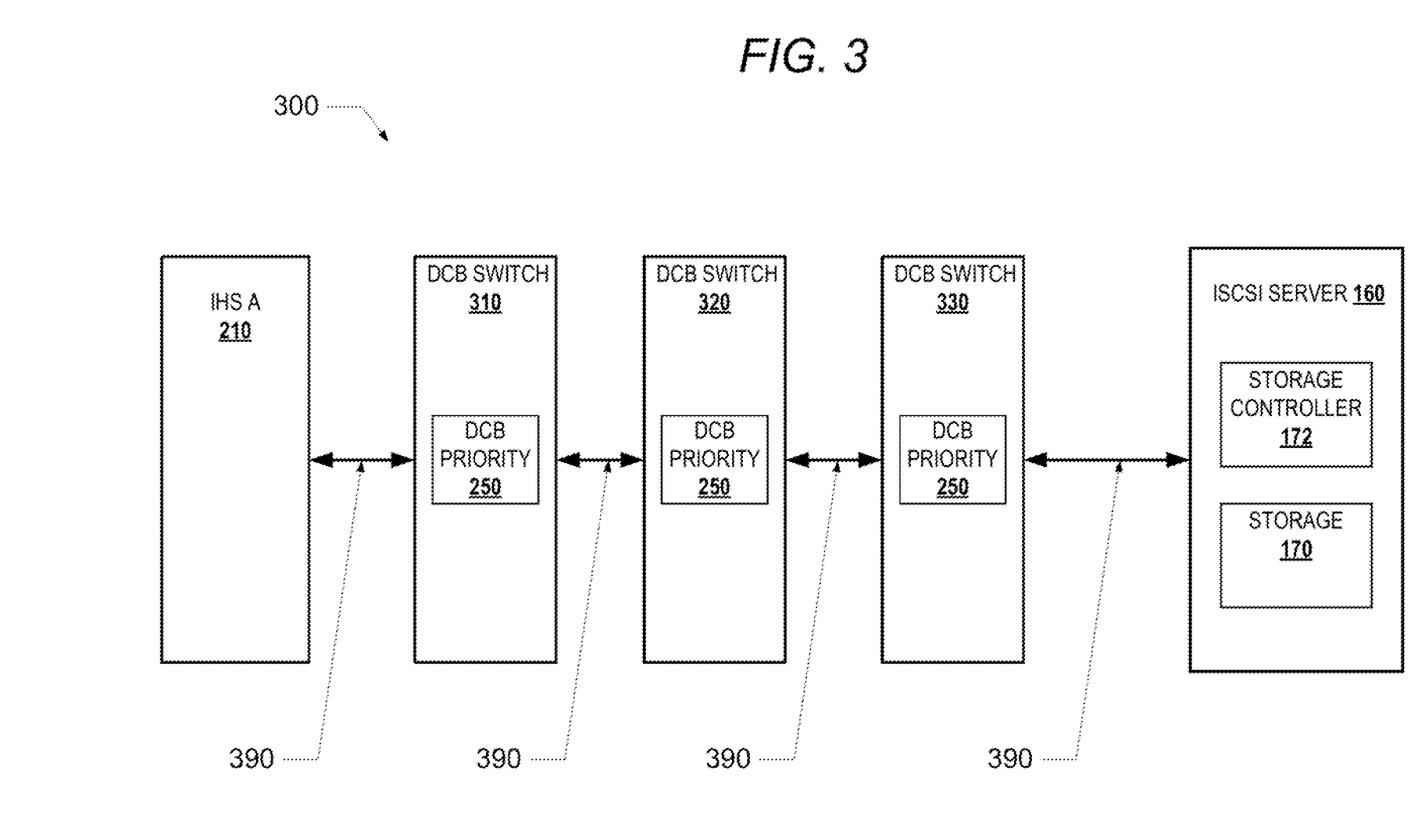
FIG. 3 illustrates a block diagram of another example communication network using multiple DCB enabled switches in accordance with one or more embodiments.

FIG. 3 illustrates another embodiment of a communication network 300 that utilizes multiple DCB enabled switches 220. In the discussion of FIG. 3, reference is also made to elements described in FIG. 1 and FIG. 2. Communication network 300 includes IHS A 210 on which iSCSI initiator executes, DCB enabled switches 310, 320, 330 and iSCSI server 160 on which iSCSI target executes. The components of communication network 300 are linked via communication fabric 390. Each of DCB enabled switches 310, 320 and 330 provides specific DCB priorities 250 to support I/O data transmission and/or other communication between iSCSI initiator and iSCSI target. Each of DCB enabled switches 310, 320 and 330 independently determines DCB priorities 250, based on the individual detection of the DCB set priority response from iSCSI target, and routes or transmits I/O data 265 between the iSCSI initiator and iSCSI target through DCB switches 310, 320 and 330 utilizing the respective, individually-determined DCB priority 250.

Figure 4:
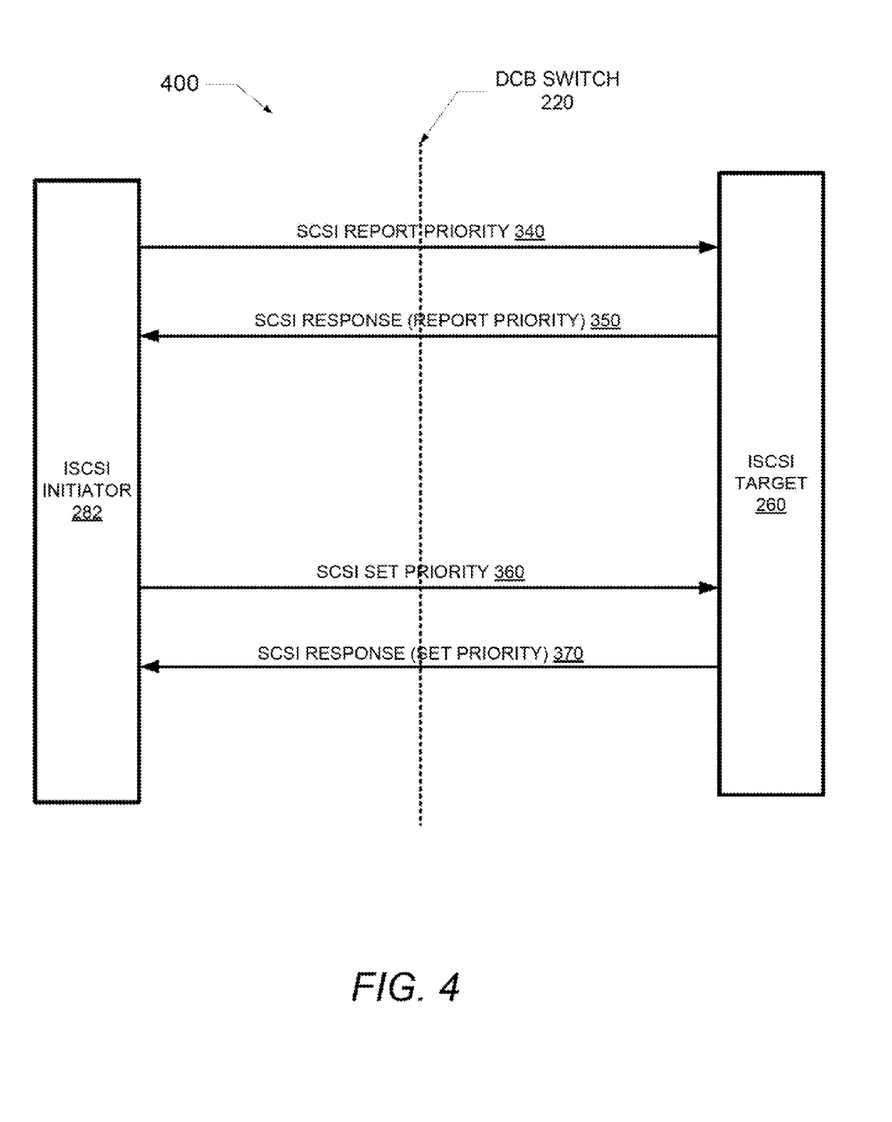
FIG. 4 illustrates an example of SCSI commands being transmitted between an initiator and a target in accordance with one or more embodiments.

Turning to FIG. 4, an example SCSI messaging diagram 400 for the transmission of SCSI commands and responses and I/O data is shown. SCSI messaging diagram 400 depicts SCSI commands and responses being transmitted between iSCSI initiator 282 and iSCSI target 260. In the discussion of FIG. 4, reference is also made to elements described in FIG. 1 and FIG. 2. To establish a new priority session or modify an existing sessions' priority, iSCSI initiator 282 transmits a SCSI report priority command 340 that is transmitted via DCB switch 220 and received by iSCSI target 260. In response to the SCSI report priority command 340, iSCSI target 260 transmits a SCSI report priority response 350 that is routed via DCB switch 220 and received by iSCSI initiator 282. In response to receiving the SCSI report priority response 350, iSCSI initiator 282 transmits a SCSI set priority command 360 that is transmitted via DCB switch 220 and received by iSCSI target 260. In response to the SCSI set priority command 340, iSCSI target 260 transmits a SCSI set priority response 370 that is routed via DCB switch 220 and received by iSCSI initiator 282. The SCSI report priority response 350 can contain priority data 254 that is used by DCB enabled switch 220 to determine and assign DCB priority values for ports 222-228.

The described processes involving the generation and transmission of SCSI commands can, in one embodiment, be directed by an application executing on IHS 100 that requires specific I/O treatment of data being communicated with the I/O storage devices on the SCSI connected SAN. In one embodiment, the application is enhanced with and/or includes the intelligence to indicate a priority that is required for specific I/O operations and generate a hint of the priority that is communicated within the SCSI set priority command by the iSCSI initiator. In another embodiment, the driver of the iSCSI initiator is enhanced with this capability of identifying when higher priority is required for certain I/O data communication. In yet another embodiment, a separate utility or agent can be provided that executes on the IHS 100 and which monitors all applications and requests for I/O data. The utility or agent then triggers the iSCSI driver to initiate the request for higher priority access for data communication based on the needs of the applications running on the IHS 100.

Figure 5:
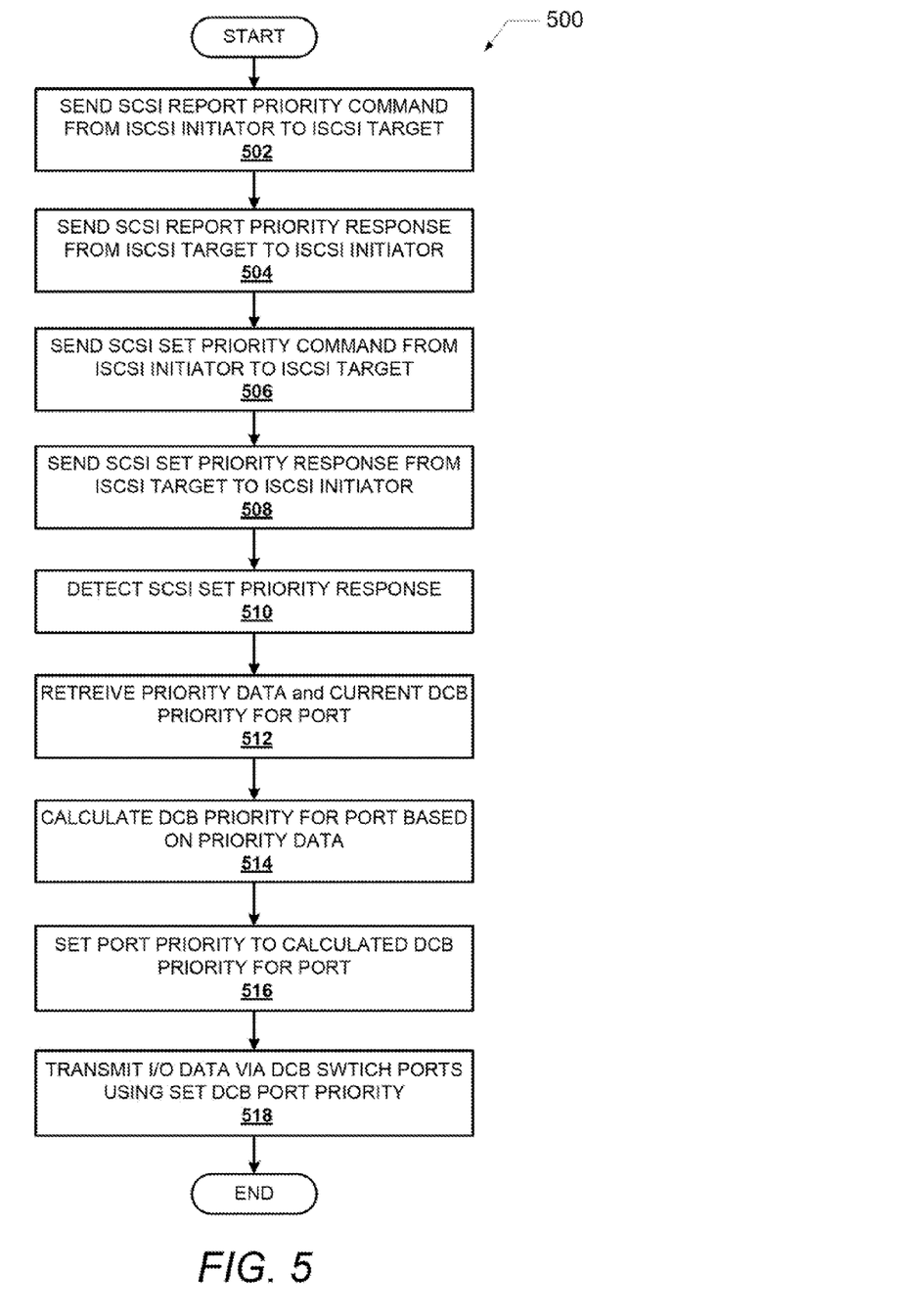
FIG. 5 is a flow chart illustrating one example of the method of prioritizing data transmissions for a switch port in a network system by setting DCB priority values in accordance with one or more embodiments.
Figure 6:
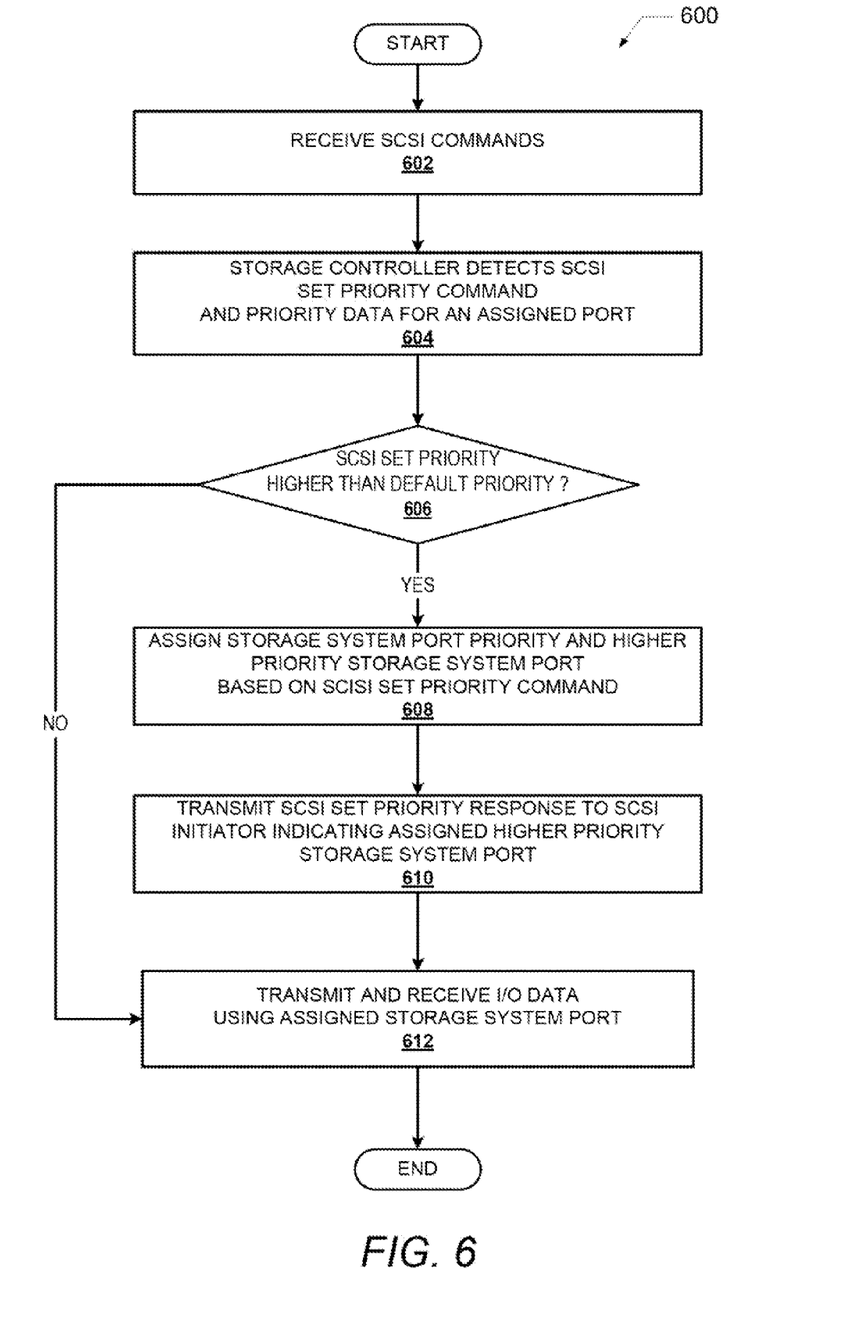
FIG. 6 is a flow chart illustrating one example of the method of prioritizing data transmission among several storage system ports in a storage area network in accordance with one or more embodiments.
Figure 7:
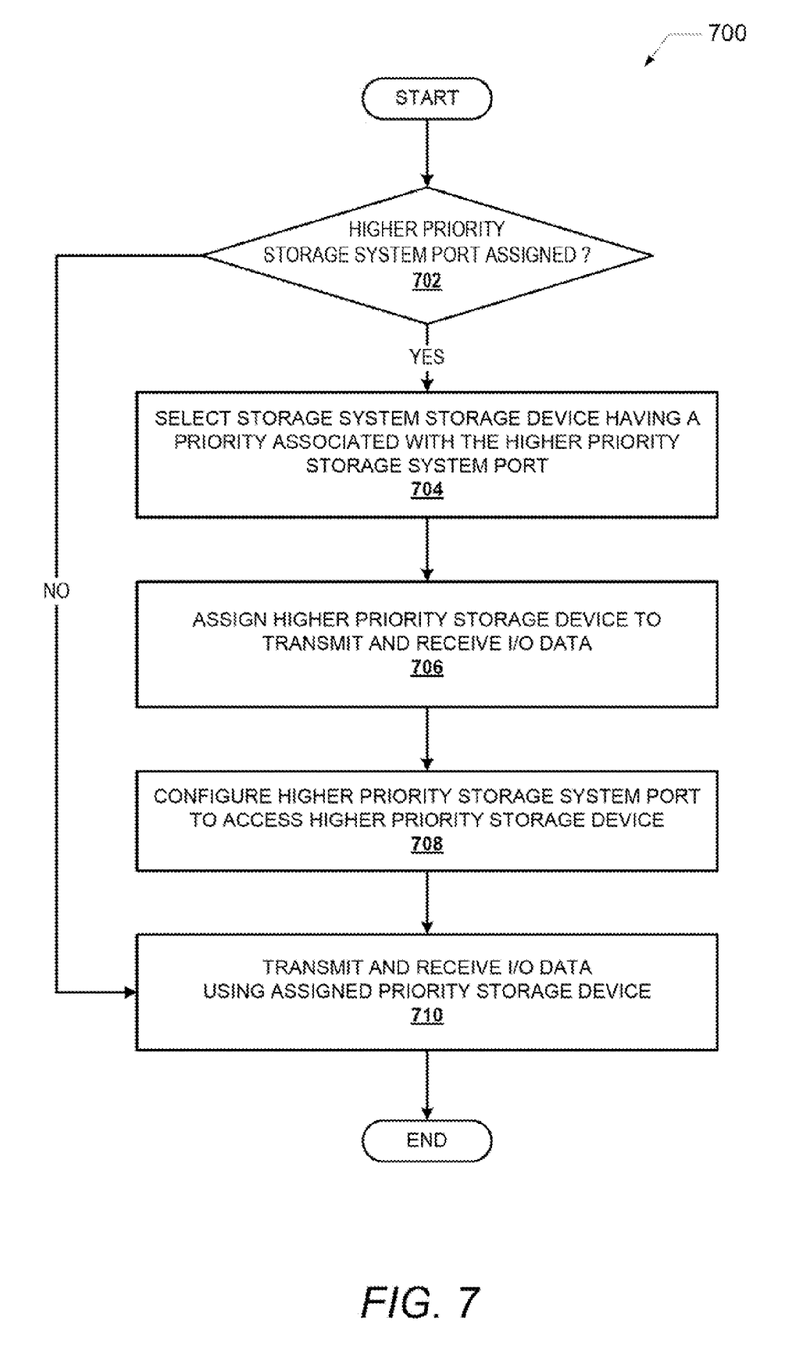
FIG. 7 is a flow chart illustrating one example of the method of prioritizing data storage among several storage devices in a storage area network in accordance with one or more embodiments.

FIG. 5, FIG. 6 and FIG. 7 present flowcharts illustrating example methods by which IHS 100 and components within communication network 200, presented within the preceding figures, perform different aspects of the processes that enable one or more embodiments of the disclosure. Generally, method 500, method 600 and method 700 collectively represent switch controller and storage controller implemented methods that assign different priorities to switch ports and storage system ports, respectively, to support a desired quality of service (QoS) for data transmission via a DCB switch, based on the assigned priorities. The description of each method is provided with general reference to the specific components illustrated within the preceding figures. Generally, each method is described as being implemented via one of switch controller 240 and storage controller 172 and particularly the execution of code provided by software/firmware acting within switch priority manager 242 and storage priority manager 269. It is however appreciated that certain aspects of the described methods may be implemented via other processing devices and/or execution of other code. In the discussion of FIG. 5, FIG. 6 and FIG. 7, reference is also made to elements described in FIG. 1-FIG. 4.

FIG. 5 illustrates an example method of prioritizing data transmissions for a switch port in an iSCSI network system by autonomously setting DCB priority values at the DCB switches. Method 500 begins at the start block and proceeds to block 502 where iSCSI initiator 282 transmits a SCSI report priority command 340 via DCB switch 220 to iSCSI target 260. In response to receiving the SCSI report priority command 340, iSCSI target 260 transmits a SCSI report priority response 350 that is routed via DCB switch 220 to iSCSI initiator 282 (block 504). In response to receiving the SCSI report priority response 350, iSCSI initiator 282 transmits a SCSI set priority command 360 via DCB switch 220 to iSCSI target 260 (block 506). In response to receiving the SCSI set priority command 340, iSCSI target 260 transmits a SCSI set priority response 370 that is routed via DCB switch 220 to iSCSI initiator 282 at block 508. Switch priority manager 242 detects or snoops on the SCSI set priority response 370 being transmitted via switch ports 222-228 along with the I/O data 265 (block 510).

In response to detecting the SCSI set priority response 370, switch priority manager 242 retrieves priority data 254 established by the SCSI target and the current DCB priority 250 for the ports at block 512. Based on the retrieved priority data 254, switch priority manager 242 autonomously calculates or determines (block 514) a data center bridging (DCB) priority 250 for a pair of the switch ports 222-228 allocated/assigned to support the data transfer and/or message communication between the specific pairing of iSCSI initiator and iSCSI target. Switch priority manager 242 sets (block 516) the DCB priority value for the allocated switch ports to the determined DCB priority value that correlates to the priority data 254. At block 518, DCB switch 220 supports transmission of the I/O data between the SCSI initiator 282 and the SCSI target 260 with a priority of the pair of switch ports set to the determined DCB priority values. Method 500 then ends. In one embodiment, the initial transmitted SCSI commands 340, 360 (FIG. 4) and responses 350, 370 (FIG. 4) between the SCSI initiator 282 and the SCSI target 260 are transmitted via DCB switch 220 using a default DCB priority value.

With reference to FIG. 6, a flow chart illustrating one embodiment of a method for prioritizing data transmission between several storage ports in a storage area network is shown. Method 600 begins at the start block and proceeds to block 602 where SCSI commands 283, 287 that are transmitted by an iSCSI initiator 282, 286 via DCB switch 220 are received by iSCSI target 260. Storage priority manager 269 detects receipt, via a first assigned storage port 230, of a SCSI set priority command, which includes priority data (block 604). Storage priority manager 269 determines at decision block 606 if the detected SCSI set priority command is a request to assign a storage system port priority 266 that has a higher priority than a default initial storage system port priority assigned to I/O data 265 transmission. The higher priority port can have at least one of a greater bandwidth, a faster throughput, or a greater security than the default assigned storage system port. The higher priority port can also be associated with a specific storage device that has a faster data storage and retrieval capability that a default storage device.

In response to the detected SCSI set priority command being a request to assign a specific priority that is a higher priority relative to a default initial priority assigned to I/O data transmission via the assigned first storage port 230, storage priority manager 269 assigns an available higher priority storage port 232 for communicating the I/O data (block 608). Storage priority manager 269 generates and transmits a SCSI set priority response to the SCSI initiator indicating that a higher priority storage system port 232 has been assigned for subsequent communication of the I/O data between the SCSI initiator and the allocated storage device (block 610). At block 612, storage controller 172 communicates the I/O data between the iSCSI initiator 282 and the allocated storage device using the assigned higher priority storage port 232. In response to the detected SCSI set priority command being a request to assign a specific priority that is lower than or equal to the default initial priority assigned to I/O data transmitted via the assigned first storage port 230, at decision block 606, storage controller 172 communicates the I/O data between the iSCSI initiator 282 and iSCSi server 160 using the first assigned storage port 230 (block 612). Method 600 then terminates at the end block.

Turning to FIG. 7, a flow chart illustrating one embodiment of a method for prioritizing data transmission and storage among several storage devices in a storage area network is shown. Method 700 begins at the start block and proceeds to block 702 where storage priority manager 269 determines if a higher priority storage port (i.e. port 4 232) has been assigned. In response to a higher priority storage port being assigned, storage priority manager 269 selects one of the storage system storage devices 270-274 having a commensurate or corresponding priority to the assigned higher priority storage port 4 232 (block 704). In one embodiment, the storage system storage devices 270-274 can have different performance parameters or attributes such as data bandwidth, data throughput rate, data transmission rate, data capacity and data security. Storage priority manager 269 assigns the selected higher priority storage device to respective storage port 4 232 to complete communication of the I/O data between the iSCSI initiator 282 and the selected storage device (block 706).

Storage priority manager 269 configures the higher priority storage port 4 232 to access the assigned higher priority storage device to complete the transmission of I/O data 265 between the iSCSI initiator 282 and the selected storage device (block 708). At block 710, storage controller 172 communicates the I/O data between the iSCSI initiator 282 and iSCSi server 160 using the assigned priority storage device. In response to a higher priority storage port not being assigned at decision block 702, storage controller 172 communicates the I/O data between the iSCSI initiator 282 and iSCSi server 160 using the default assigned storage device associated with the default storage system port (i.e., port 3 230) (block 710).

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of prioritizing data transmissions in a network system having at least one switch, the method comprising:
a switch controller detecting a small computer system interface (SCSI) set priority response being transmitted via at least a first switch port between SCSI devices, wherein the SCSI devices are a SCSI target and a SCSI initiator that are communicating SCSI commands and responses and transmitting input/output (I/O) data via the first switch port;
in response to detecting the SCSI set priority response:
retrieving priority data established by the SCSI target; and based on the retrieved priority data, autonomously setting a data center bridging (DCB) priority for the first switch port to a first DCB priority value correlated to the retrieved priority data; and subsequently supporting transmission of the I/O data between the SCSI initiator and the SCSI target with a priority of the first switch port set to the first DCB priority value.

2. The method of claim 1, further comprising:

passing initial SCSI commands and responses between the SCSI initiator and the SCSI target using a default DCB priority value, wherein the passing of the initial SCSI commands includes:

receiving, by the switch controller, a SCSI report priority command from the SCSI initiator and forwarding the SCSI report priority command to the SCSI target;

receiving, by the switch controller, a SCSI report priority response from the SCSI target and forwarding the SCSI report priority response to the SCSI initiator; and in response to detecting the SCSI report priority response, initiating a monitoring of the first switch port for receipt of the SCSI set priority response, wherein the receipt of the SCSI set priority response triggers the switch to change the DCB of the first switch port to reflect a priority established by the SCSI target.

3. The method of claim 2, wherein passing the SCSI commands and responses further comprises:

receiving, by the switch controller, a SCSI set priority command from the SCSI initiator and transmitting the SCSI set priority command to the SCSI target; and receiving, by the switch controller, the SCSI set priority response from the SCSI target and transmitting the SCSI set priority response to the SCSI initiator.

4. The method of claim 1, wherein retrieving priority data established by the SCSI target in response to detecting the SCSI set priority response comprises:

the switch controller snooping a first port of the SCSI target that is being utilized to communicate the I/O data with the SCSI initiator to detect a priority setting of the first port; and the switch controller setting the first DCB priority value of the first switch port based on the priority setting of the first port.

5. The method of claim 1, further comprising:

calculating the first DCB priority value for the first switch port based on the retrieved priority data; and in response to the first DCB priority value being different from a previous DCB priority value of the first switch port, updating the DCB priority value of the first switch port to the first DCB priority value.

6. The method of claim 4, further comprising:

when the SCSI target is a storage facility, the priority setting of the first port is a storage controller port setting associated with an assigned first storage port that is handling communication between the SCSI initiator and the target.

7. A computer network system comprising:

at least one switch configured to route and transmit data between a host computer and a target device, the at least one switch having a plurality of switch ports;

a switch controller coupled to the switch for controlling operation of the switch, wherein the switch controller comprises logic that:

detects a small computer system interface (SCSI) set priority response being transmitted via at least a first switch port between SCSI devices, wherein the SCSI devices are a SCSI target and a SCSI initiator that are communicating SCSI commands and responses and transmitting input/output (I/O) data via the first switch port;

in response to detecting the SCSI set priority response:

retrieves priority data established by the SCSI target; and based on the retrieved priority data, autonomously sets a data center bridging (DCB) priority for the first switch port to a first DCB priority- value correlated to the retrieved priority data; and subsequently supports transmission of the I/O data between the SCSI initiator and the SCSI target with a priority of the first switch port set to the first DCB priority value.

8. The computer network system of claim 7, wherein the switch controller further comprises logic that:

passes initial SCSI commands and responses between the SCSI initiator and the SCSI target using a default DCB priority value, wherein the passing of the initial SCSI commands includes:

receiving a SCSI report priority command from the SCSI initiator and forwarding the SCSI report priority command to the SCSI target;

receiving a SCSI report priority response from the SCSI target and forwarding the SCSI report priority response to the SCSI initiator; and in response to detecting the SCSI report priority response, initiating a monitoring of the first switch port for receipt of the SCSI set priority response, wherein the receipt of the SCSI set priority response triggers the switch to change the DCB of the first switch port to reflect a priority established by the SCSI target.

9. The computer network system of claim 7, wherein the switch controller further comprises logic that:

receives a SCSI set priority command from the SCSI initiator and transmits the SCSI set priority command to the SCSI target; and receives the SCSI set priority response from the SCSI target and transmits the SCSI set priority response to the SCSI initiator.

10. The computer network system of claim 7, wherein the switch controller further comprises logic that:

snoops a first port of the SCSI target that is being utilized to communicate the I/O data with the SCSI initiator to detect a priority setting of the first port; and sets the first DCB priority value of the first switch port based on the priority setting of the first port.

11. A method of prioritizing data transmissions in a network storage system providing a SCSI target, the method comprising:

a storage system controller detecting receipt of a small computer system interface (SCSI) set priority command from a SCSI initiator with which the storage system is communicating SCSI commands and responses via a first assigned storage port; and in response to the detected SCSI set priority command being a request to assign a specific priority that is a higher priority relative to a default initial priority assigned to I/O data transmitted via the assigned first storage port:

assigning an available higher priority storage port for communicating the I/O data; and generating and transmitting a SCSI set priority response to the SCSI initiator to indicate that the higher priority has been assigned for subsequent communication of the I/O data between the SCSI initiator and the storage system.

12. The method of claim 11, further comprising:
receiving, via the first storage system port having a first bandwidth, a SCSI report priority command from the SCSI initiator;
generating and transmitting a SCSI report priority response to the SCSI initiator indicating a default priority of the first storage system port; and
subsequently receiving the SCSI set priority command from the SCSI initiator.

13. The method of claim 11, wherein assigning the available higher priority storage port comprises:
determining that the higher priority storage port is available to be used for the communication of the I/O data, wherein the higher priority port has at least one of a greater bandwidth, a faster throughput, and a greater security than the first storage port;
configuring the higher priority port to support the communication between the SCSI initiator and the storage system; and
transferring communication settings from the first storage port to the higher priority port; and
wherein the storage system includes at least two ports available to transmit input/output (I/O) data between the storage system and SCSI initiators and the at least two ports have different default assigned priorities that can be dynamically selected by the storage controller based on a priority assigned to a communication link established between the SCSI initiator and the storage system.

14. The method of claim 13, further comprising:
in response to assigning an available higher priority storage port for communicating the I/O data, selecting from among multiple available storage devices of different priorities, a first storage device having a commensurate priority to the higher priority storage port;
assigning the first higher priority storage device to complete communication of the I/O data between the SCSI initiator and the storage system; and
configuring the higher priority storage port to access the first higher priority storage device to complete I/O data transmission between the SCSI initiator and the storage system.

15. The method of claim 13, further comprising:
in response to assigning an available higher priority storage port for communicating the I/O data, selecting from among multiple available faster throughput storage devices, a first storage device having a throughput rate commensurate to the higher priority storage port;
assigning the first higher throughput storage device to complete communication of the I/O data between the SCSI initiator and the storage system; and
configuring the higher priority storage port to access the first higher throughput storage device to complete I/O data transmission between the SCSI initiator and the storage system.

16. The method of claim 14, further comprising:
moving the transmitted I/O data based on the assigned storage device priority.

17. A network-accessible storage system comprising:
at least one storage system having a plurality of storage devices and a plurality of storage system ports;
a storage controller coupled to the storage system for controlling operation of the storage system, wherein the storage controller comprises logic that:
receives a plurality of small computer system interface (SCSI) commands transmitted from a SCSI initiator to a SCSI target via a first storage system port having a first bandwidth, the storage system ports being utilized to transmit input/output (I/O) data between the SCSI initiator and the SCSI target;
detects a SCSI set priority command from among the received SCSI commands; and
in response to the detected SCSI set priority command being a high priority SCSI set priority command, moves the transmitted I/O data from the first storage system port to a second storage system port having a second bandwidth and wherein the second bandwidth is greater than the first bandwidth.

18. The network-accessible storage system of claim 17, wherein the storage controller further comprises logic that:
receives, via the first storage system port having the first bandwidth, a SCSI report priority command from the SCSI initiator;
generates and transmits a SCSI report priority response to the SCSI initiator indicating a default priority of the first storage system port; and
subsequently receives the SCSI set priority command from the SCSI initiator.

19. The network-accessible storage system of claim 17, wherein moving the transmitted I/O data further comprises logic that:
determines that the second storage system port is available to be used for the communication of the I/O data, wherein the second storage system port has at least one of a greater bandwidth, a faster throughput, and a greater security than the first storage port;
configures the second storage system port to support the communication between the SCSI initiator and the storage system;
transfers communication settings from the first storage system port to the second storage system port; and
wherein the first and second storage system ports have different default assigned priorities that can be dynamically selected by the storage controller based on a priority assigned to a communication link established between the SCSI initiator and the storage system.

20. The network-accessible storage system of claim 19, wherein the storage controller further comprises logic that:
in response to assigning the second storage system port, to communicate the I/O data, selects from among multiple available storage devices of different priorities, a first storage device having a commensurate priority to the second storage system port;
assigns the first higher priority storage device to complete communication of the I/O data between the SCSI initiator and the storage system; and
configures the second storage system port to access the first higher priority storage device to complete I/O data transmission between the SCSI initiator and the storage system.

21. The network-accessible storage system of claim 19, wherein the storage controller further comprises logic that:
in response to assigning the second storage system port to communicate the I/O data, selects from among multiple available faster throughput storage devices, a first storage device having a throughput rate commensurate to the second storage system port;
assigns the first higher throughput storage device to complete communication of the I/O data between the SCSI initiator and the storage system; and configures the second storage system port to access the first higher throughput storage device to complete I/O data transmission between the SCSI initiator and the storage system.

* * * * *